United States Patent [19]

Moroto et al.

[11] Patent Number: 4,627,308

[45] Date of Patent: Dec. 9, 1986

[54] AUTOMATIC TRANSMISSION FOR A VEHICLE

[75] Inventors: Shuzo Moroto; Shiro Sakakibara, both of Aichi, Japan

[73] Assignee: Aisin Warner Kabushiki Kaisha, Aichi, Japan

[21] Appl. No.: 604,722

[22] Filed: Apr. 27, 1984

[51] Int. Cl.[4] .......................................... F16H 37/02
[52] U.S. Cl. ........................................ 74/689; 74/740; 74/761; 74/764
[58] Field of Search ................ 74/689, 695, 700, 701, 74/740, 760, 761, 764, 765, 785, 788, 339; 192/53 E

[56] References Cited

U.S. PATENT DOCUMENTS

| | | | |
|---|---|---|---|
| 3,118,319 | 1/1964 | Straub | 74/765 X |
| 3,128,636 | 4/1964 | Graybill | 74/689 X |
| 3,375,734 | 4/1968 | Lemons | 74/689 |
| 3,479,908 | 11/1969 | Kress et al. | 74/689 X |
| 3,804,218 | 4/1974 | Krutashov | 192/53 E |
| 3,910,390 | 10/1975 | Eichinger | 192/53 E |
| 3,986,413 | 10/1976 | Stockton | 74/695 X |
| 4,074,581 | 2/1978 | Stevens | 74/760 X |
| 4,083,319 | 4/1977 | Thomas | 192/53 E |
| 4,328,717 | 5/1982 | Arai | 74/760 |
| 4,329,888 | 5/1982 | Falzoni | 74/689 |
| 4,353,270 | 10/1982 | Falzoni | 74/689 |
| 4,392,394 | 7/1983 | Hofbauer et al. | 74/740 X |

FOREIGN PATENT DOCUMENTS

| | | | |
|---|---|---|---|
| 0035806 | 9/1981 | European Pat. Off. | 74/701 |
| 0043641 | 1/1982 | European Pat. Off. | 74/740 |
| 56-153147 | 11/1981 | Japan | 74/740 |
| 57-47059 | 3/1982 | Japan | 74/740 |
| 559054 | 12/1977 | U.S.S.R. | 74/339 |

*Primary Examiner*—Kenneth J. Dorner
*Assistant Examiner*—Dwight G. Diehl
*Attorney, Agent, or Firm*—Koda and Androlia

[57] ABSTRACT

An automatic transmission for a front-engine front-drive vehicle including a fluid coupling, a belt type continuously-variable speed transmission (CVT), a planetary gear mechanism, a forward-reverse changeover mechanism and a differential device. The forward-reverse changeover mechanism includes a brake disposed between the planetary gear mechanism and the output of CVT. The planetary gear mechanism is provided with a low-high speed changeover mechanism. Each of the clutch and the brake is provided with recesses in one part thereof and are provided with projections in the other part which can be fitted into the recesses, and the dimension of the outer diameter thereof is small as compared with that of clutches or brakes of the wet multiple-disc type.

2 Claims, 2 Drawing Figures

AUTOMATIC TRANSMISSION FOR A VEHICLE

BACKGROUND OF THE INVENTION

The present invention relates to an automatic transmission for a vehicle which uses a belt type continuously-variable speed transmission system (hereinafter referred to as "CVT").

The CVT includes an input pulley, an output pulley and an endless belt extended between the pulleys. The input pulley and the output pulley each includes a fixed sheave secured to a rotational shaft and a movable sheave mounted movably in an axial direction of the rotational shaft by means of a servo motor, and the movable sheave can be displaced axially to thereby change the ratio of rotational speed of the output pulley relative to that of the input pulley in the range of approximately 0.5 to 2.0.

When the CVT is used as the transmission for a vehicle, a first rotational shaft having the input pulley of the CVT mounted thereon is connected to an output shaft of an engine through a coupling means, and between a second rotational shaft having the output pulley of the CVT mounted thereon and a differential device are provided with a planetary gear mechanism, a forward-reverse changeover mechanism. A low-high speed changeover mechanism is provided in the planetary gear mechanism, if necessary. Generally speaking, the forward-reverse changeover mechanism and the low-high speed changeover mechanism are necessary to provide with a clutch for connecting specific elements of the planetary gear mechanism or a brake adapted to connect a specific element of the planetary gear mechanism in a stationary position. However, when a wet multiple-disc type clutch or brake is employed as the aforementioned clutch or brake, it is difficult to load the transmission on a small automobile because the diameter of a frictional engaging element of said wet multiple-disc type clutch or brake is large, resulting in a large dimension of the whole transmission for a vehicle.

What is needed is an automatic transmission for a vehicle wherein a forward-reverse changeover gear mechanism or a low-high speed changeover gear mechanism, which is provided between the rotational shaft having the output pulley of the CVT mounted thereon and a transmission output shaft for a vehicle, is miniaturized and light-weighted.

SUMMARY OF THE INVENTION

Generally speaking, in accordance with the present invention, an automatic transmission for a vehicle especially suitable for a small size, front-engine front-drive automobile provided with a belt type continuously-variable speed transmission system (CVT) and a planetary gear mechanism, is provided. The CVT includes an input pulley mounted on a first shaft, an output pulley mounted on a second shaft and an endless belt extended between the input pulley and output pulley to transmit power. The first shaft is disposed coaxially with and coupled to an output shaft of a coupling means, and the second shaft is disposed parallel with the first shaft. The input pulley and output pulley each includes a fixed sheave and a movable sheave which is well known.

The planetary gear mechanism has its input shaft and output shaft disposed coaxially with the second shaft of the CVT and includes at least one forward speed range and one reverse range.

The planetary gear mechanism according to the present invention is of the type in which a first element thereof is braked and held in a stationary position by means of brake means thereby establishing the forward range whereas a second element is braked and held in a stationary position by means of brake means thereby establishing the reverse range. To this end, one end of a first intermediate shaft is connected to the first element whereas one end of a second intermediate shaft is connected to the second element, the first and second intermediate shafts being selectively held by the forward-reverse changeover mechanism. The brake means includes a sleeve which is disposed coaxially with and slidably movable but non-rotatable with respect to the rotational axis of the input shaft of the planetary gear mechanism and having splines adapted to selectively mesh with splines formed on the first and second intermediate shafts, whereby the outer diameter of the brake means is reduced as compared with a wet multiple-disc type brake means and the braking effect of the brake means is not impaired.

According to the present invention, a low-high speed changeover mechanism is further provided in the planetary gear mechanism. This low-high speed changeover mechanism includes a first and a second discs disposed perpendicularly and rotatably with respect to a rotational axis of an output shaft of the planetary gear mechanism, a sleeve which is movable axially of the rotational axis and rotatable integrally with a third element of the planetary gear mechanism and a shift lever having one end placed in engagement with the sleeve, the first and second discs being formed with splines, and the sleeve being formed with splines selectively engageable with the splines formed on the first and second discs. When the sleeve is shifted by the shift lever to a position where the sleeve is selectively connected to the first disc, the first element of the planetary gear mechanism is connected to the third element to form the forward range gear train whereas when the sleeve is shifted by the shift lever to a position where the sleeve is selectively connected to the second disc, the third element of the planetary gear mechanism is connected to a fourth element of the planetary gear mechanism to form another forward range gear train.

Accordingly, it is a primary object of the present invention to provide an improved and compact automatic transmission having a CVT and a planetary gear mechanism which automatic transmission is capable of establishing a forward range gear train when a first element of the planetary gear mechenism is selectively held in a stationary position by means of brake means and of establishing a reverse range gear train when a second element of the planetary gear mechanism is selectively held in a stationary position by means of brake means.

Another object of the present invention is to provide an improved and compact automatic transmission having a CVT and a planetary gear mechanism in which the planetary gear mechanism includes the first element, the second element, a first intermediate shaft connected to the first element, a second intermediate shaft connected to the second element and the brake means including splines formed on the first and second intermediate shafts, respectively, and a sleeve having splines adapted to selectively mesh with the splines formed on the first intermediate shaft to hold the first element in the stationary position and to selectively mesh with the splines formed on the second intermediate shaft to hold the second element in the stationary position, whereby the outer diameter of the brake means is reduced in compared with that of a wet multiple-disc type brake means.

A further object of the present invention is to provide an improved and compact automatic transmission having a CVT and a planetary gear mechanism in which the planetary gear mechanism includes the first element, the second element, the third element, a fourth element, brake means selectively holds the first element and the second element in the stationary position, respectively, and clutch means disposed between the third element and the fourth element and adapted to establish another forward range gear train when the third element is connected to the fourth element by means of the clutch means.

Still other objects and advantages of the invention will in part be obvious and will in part be apparent from the specification.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
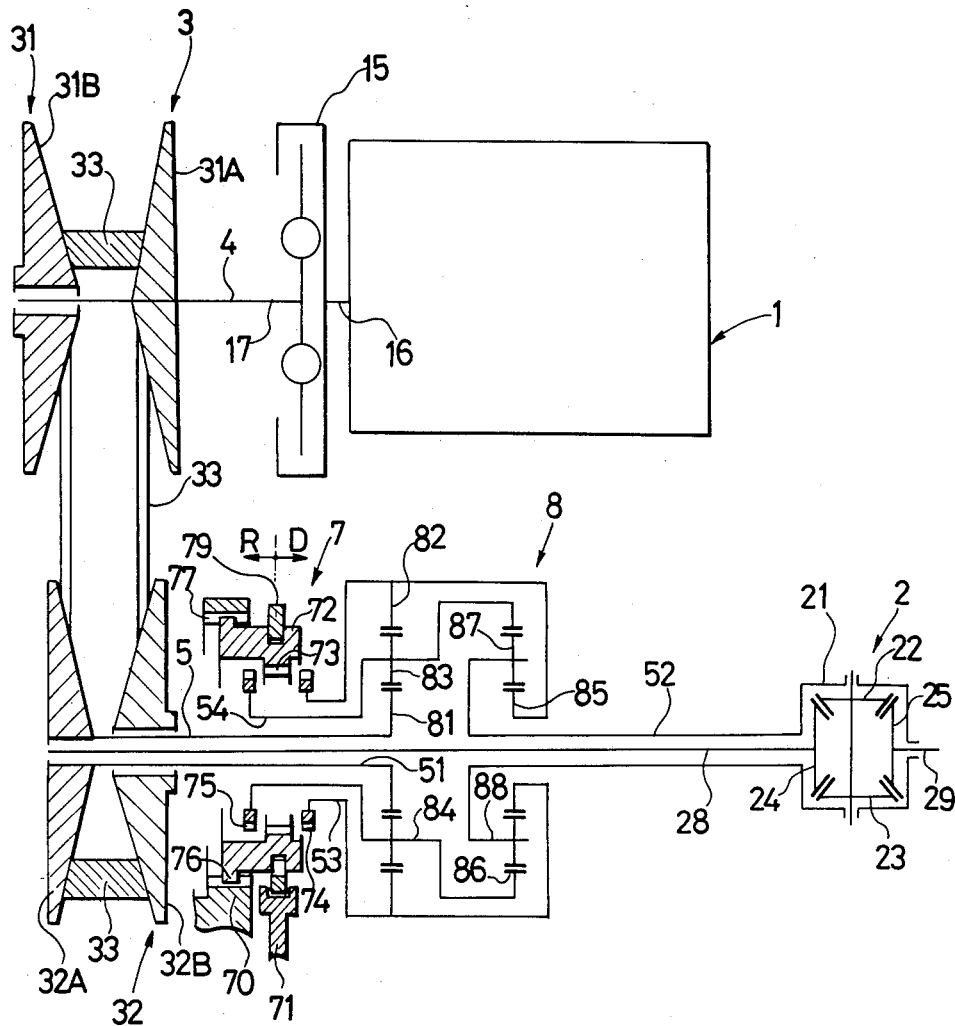
FIG. 1 is a schematic sectional view of an automatic transmission in accordance with an embodiment of the present invention.

FIG. 1 shows an embodiment in which the present invention is applied to an automatic transmission for a vehicle of the front-engine front-drive system. This automatic transmission comprises a coupling means 15, a belt type continuously-variable speed transmission system (CVT) 3, a planetary gear mechanism 8, a differential device 2 and a transmission housing 70 for accommodating these elements and fixedly mounted on an engine 1. The housing 70 is partially shown in FIG. 1.

The coupling means 15 is shown in form of a fluid coupling including an input shaft 16 connected coaxially with an output shaft (not shown) of the engine 1 and an output shaft 17 disposed coaxially with the input shaft 16. Other automatic clutch means such as a torque converter, a centrifugal clutch, a magnetic clutch, etc. can be used in place of the fluid coupling 15.

The CVT 3 comprises an input pulley 31 mounted on a first shaft 4, an output pulley 32 mounted on a second shaft 5, and an endless belt 33 extended between the pulleys 31 and 32 to transmit power. The pulleys 31, 32 each has fixed sheaves 31A, 32A secured to the shafts 4, 5, and movable sheaves 31B, 32B mounted slidably axially on the shafts 4, 5, respectively. Each of the movable sheaves 31B, 32B is operated by hydraulic servomotor mounted on the shafts 4, 5, respectively. The first shaft 4 is disposed coaxially with the output shaft 17 of the coupling means 15 and coupled thereto. The second shaft 5 is formed in the form of a tubular shaft, which rotational axis is arranged parallel with the rotational axis of the first shaft 4.

The planetary gear mechanism 8 has an input shaft 51 and an output shaft 52 disposed coaxially with the rotational axis of the second shaft 5 of the CVT 3 and has two sets of planetary gear set. The first planetary gear set comprises a first sun gear 81 fixed concentrically with the input shaft 51, a first ring gear 82 arranged concentrically with the sun gear 81, at least one first planetary gear 83 meshing with the sun gear 81 and ring gear 82 and a first planetary carrier 84 for rotatably supporting the planetary gear 83 thereon. The second planetary gear set comprises a second sun gear 85 arranged concentrically with the rotational axis of the output shaft 52, a second ring gear 86 arranged concentrically with the sun gear 85, at least one second planetary gear 87 meshing with the sun gear 85 and ring gear 86 and a second planetary carrier 88 for roratably supporting the planetary gear 87 thereon. The first ring gear 82 and second sun gear 85 are connected to one end of a first intermediate shaft 53 disposed concentrically with the rotational axis of the input shaft 51 and are rotated integrally therewith, and the first planetary carrier 84 and second ring gear 86 are connected to one end of a second intermediate shaft 54 disposed concentrically with the rotational axis of the input shaft 51 and are rotated integrally therewith. The second planetary carrier 88 is connected to one end of the output shaft 52. In the planetary gear mechanism 8, when the first intermediate shaft 53 is braked and held in a stationary position and the second intermediate shaft 54 is rotated freely, a forward range gear train is formed for transmitting rotation in the same direction as that of the input shaft 51 to the output shaft 52, whereas when the second intermediate shaft 54 is braked and held in a stationary position and the first intermediate shaft 53 is rotated freely, a reverse range gear train is formed for transmitting rotation in the direction opposite to that of the input shaft 51 to the output shaft 52.

The output shaft 52 is formed in the form of a tubular shaft, the other end thereof is connected to a gear casing 21 of a differential device 2 concentrically with the rotational axis thereof. This differential device 2 comprises differential gears 22, 23 secured to a shaft supported on the casing 21 perpendicularly to the rotational axis of the casing 21 and output gears 24, 25 rotatably supported on the casing 21 with respect to the rotational axis of the casing 21, and meshed with said output gears 24, 25, respectively. Output shafts 28, 29 are connected to said output gears 24, 25, respectively, for connection with an axle (not shown) used to drive front wheels.

The transmission housing, which is not totally shown in FIG. 1 but partly indicated at 70, is secured to the engine 1. The fluid coupling 15 and input pulley 31 of the CVT 3 are rotatably supported on the housing 70 by means of the first shaft 4 and the output pulley 32 of the CVT 3, planetary gear mechanism 8 and differential device 2 are rotatably supported on the housing 70 by means of the second shaft 5 and output shaft 52.

A forward-reverse changeover mechanism 7 is formed between the output pulley 32 of the CVT 3 and the planetary gear mechanism 8. The mechanism 7 includes splines 74, 75 which are formed on the outer circumference of the other end of the first intermediate shaft 53 and on the outer circumference of the other end of the second intermediate shaft 54, respectively, a sleeve 72 which is disposed concentrically with and movable axially of the rotational axis of the input shaft 51 of the planetary gear mechanism 8, splines 73 formed on the inner circumference of the sleeve 72 and selectively engageable with the splines 74, 75, and a shift lever 71 one end of which is engaged with the sleeve 72 through a shift ring 79. The sleeve 72 has a key 76 formed axially and integrally therewith, said key is fitted into a groove 77 formed in the housing 70, and cannot be rotated with respect to the rotational axis of the input shaft 51. When the shift lever 71 is operated to move the sleeve 72 in a direction as indicated by the arrow D shown in FIG. 1 in the direction of the rotational axis, the splines 73 formed on the inner circumference of the sleeve 72 comes to mesh with the spline 74 formed on the outer circumference of the first intermediate shaft 53 to hold the first intermediate shaft 53 in the stationary position so that the second intermediate shaft 54 can be rotated freely, and hence the forward range gear train is formed. When the sleeve 72 is moved in a direction of arrow R which is opposite the arrow D, the splines 73 formed on the inner circumference of the sleeve 72 comes to mesh with the splines 75 formed on the outer circumference of the second intermediate shaft 54 to hold the second intermediate shaft at the stationary position so that the first intermediate shaft can be rotated freely, and hence the reverse range gear train is formed. The other end of the shift lever 71 projects beside the driver's seat of the vehicle.

The embodiment of the present invention shown in FIG. 1 operates as follows. The engine 1 of the vehicle is started and the lever 71 projecting besides the driver's seat is positioned to the forward or reverse position to move the shift ring by a driver. If the engine 1 is in the idling mode, engine torque generated by the engine 1 may not be transmitted to the input pulley 31 of the CVT 3 through the fluid coupling 15, and therefore, the sleeve 72 of the forward-reverse changeover mechanism 7 is readily spline-coupled with the first intermediate shaft 53 of or second intermediate shaft 54 of the planetary gear mechanism 8 to hold the first intermediate shaft 53 or second intermediate shaft 54 in the stationary position. Next, an accelerator pedal is pressed down by the driver, the engine torque is transmitted to the input shaft 4 of the CVT 3 by means of the fluid coupling 15 when the throttle opening of the engine 1 exceeds a predetermined value, and the vehicle starts to move. As is known, the CVT 3 continuously varies the ratio of rotational speed between the input shaft 4 and output shaft 5. The engine torque transmitted to the output shaft 5 of the CVT 3 is transmitted to the front wheels through the planetary gear mechanism 8, differential device 2 and output shafts 28, 29.

In the above-described transmission, the changingover of the forward range drive and reverse range drive of the planetary gear mechanism 8 is achieved in such a way that the splines 73 formed on the sleeve 72 of the forward-reverse changeover mechanism 7 is selectively meshed with the splines 74 formed on the first intermediate shaft 53 or the splines 75 formed on the second intermediate shaft 54 to selectively hold the intermediate shafts 53, 54 in the stationary position, and therefore, the dimension of the outer circumference of the forward-reverse changeover mechanism 7 can be considerably reduced and the force for braking the first intermediate shaft 53 or second intermediate shaft 54 can be considerably increased.

Figure 2:
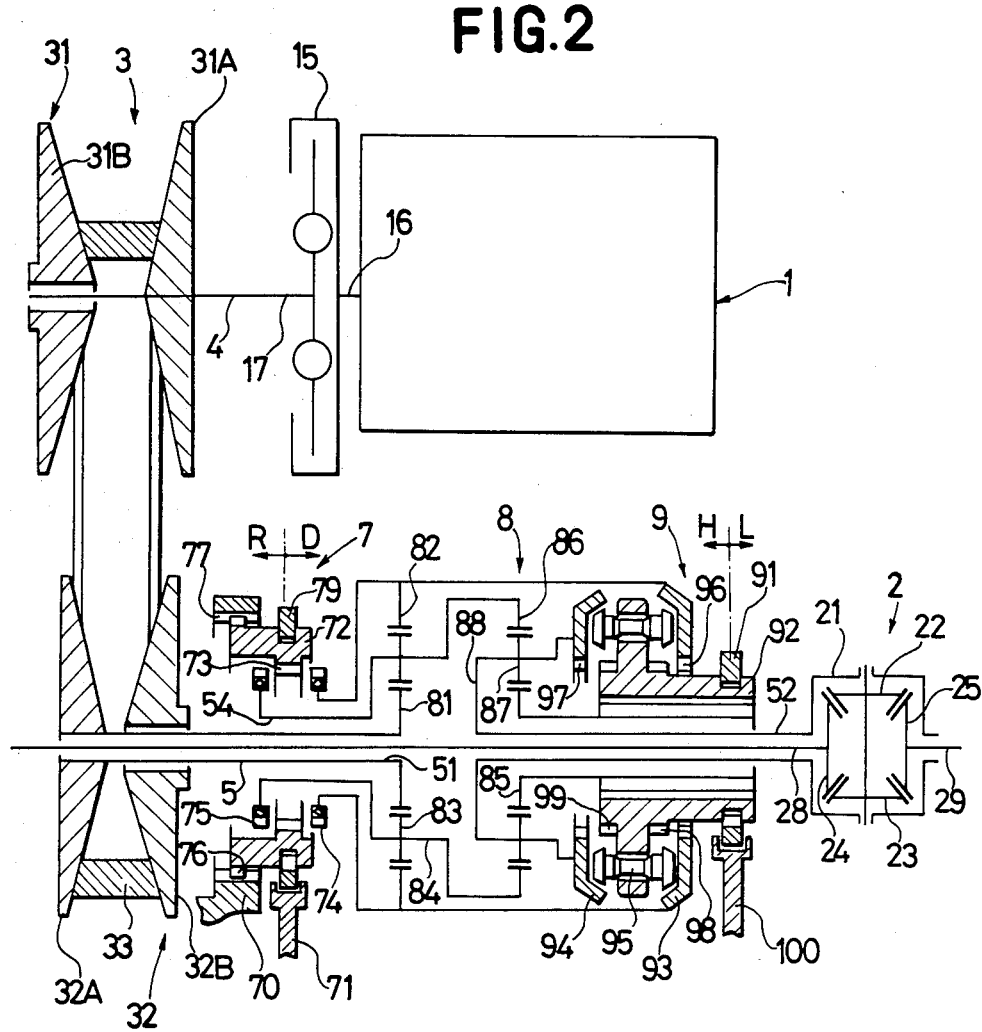
FIG. 2 is a schematic sectional view of an automatic transmission in accordance with another embodiment of the present invention.

FIG. 2 shows another embodiment of the present invention in which a low-high speed changeover mechanism 9 is further provided in the planetary gear mechanism 8 shown in FIG. 1. Accordingly, detailed explanations for parts common to those of the embodiment shown in FIG. 1 will be omitted.

The low-high speed changeover mechanism 9 includes a first and a second discs 93, 94 formed on the inner circumferences thereof with splines 96, 97, respectively, a second sleeve 92 disposed concentrically with respect to the rotational axis of the output shaft 52 of the planetary gear mechanism 8 and formed on the outer circumference thereof with splines 98, 99 for selectively meshing with the splines 96, 97 formed on the two discs 93, 94, respectively, and at least one guide pin 95 loosely supported on the sleeve 92. The first disc 93 is connected to the first ring gear 82 of the planetary gear mechanism 8, the second disc 94 is connected to the second planetary gear 88, and each of the first and second discs 93, 94 is rotatable concentrically with respect to the rotational axis of the output shaft 52 and has a mean plane thereof in a plane vertical to the rotational axis of the output shaft 52 of the planetary gear mechanism 8. The second sleeve 92 is spline-coupled axially slidably to the second sun gear 85 of the planetary gear mechanism 8 and is rotatable integrally with the sun gear 85. A shift ring 91 is relatively rotatably engaged with a groove formed on the outer circumference of the second sleeve 92 and is operated by means of a shift lever 100 directly or indirectly associated with the shift lever 71 to shift the sleeve 92 in a direction of L or H, which is indicated by the arrow in FIG. 2. When the sleeve 92 is shifted in the direction of the arrow L, the splines 98 formed on the sleeve 92 comes to mesh with the splines 96 formed on the first disc 93 to connect the first ring gear 82 with the second sun gear 85 whereby the second disc 94 may be rotated freely thereby the same forward range gear train as that of the planetary gear mechanism 8 shown in FIG. 1 is formed. When the sleeve 92 is shifted in the direction of arrow H, the splines 98 formed on the sleeve 92 is moved away from the splines 96 formed on the first disc 93 to rotate the first disc 93 and the first ring gear 82 freely and the splines 99 formed on the sleeve 92 comes to mesh with the splines 97 formed on the second disc 94 to connect the second carrier 88 to the second sun gear 85 of the planetary gear mechanism 8 thereby the second planetary gear set is interlocked, and hence a forward range high-speed gear train is formed. The guide pin 95 is disposed between opposed surfaces of the first and second discs 93, 94 with the lengthwise direction thereof being parallel with the rotational axis of the output shaft 52. When the sleeve 92 is shifted in the direction of arrow L or H, one end of the guide pin 95 comes to abut with either the first disc 93 or the second disc 94 whereby the rotational speed of the disc is synchronized with the rotational speed of the sleeve 92 to facilitate the spline-coupling between the sleeve 92 and the first disc 93 or the second disc 94. That is, the low-high speed changeover mechanism 9 corresponds to a dog clutch having the function of a synchronizer.

In the embodiment shown in FIG. 2, the upshift from the forward range low-speed gear train to the forward range high-speed gear train or the downshift from the forward range high-speed gear train to the forward range low-speed gear train is carried out by moving the second sleeve 92 in its axial direction through the shift lever 100 or shift ring 91. In this operation, one end of the guide pin 95 loosely supported on the second sleeve 92 comes into contact with one surface of the first disc 93 or second disc 94 to thereby synchronize the rotational speed of the disc in contact with the guide pin 95 with the rotational speed of the second sleeve, and thereafter, the splines formed on the second sleeve 92 is brought into engagement with the splines 96 formed on the first disc 93 or the splines 99 formed on the second sleeve 92 into engagement with the splines 97 formed on the second disc 94. Therefore, the engagement between these splines is extremely easily and positively effected.

What is claimed is:

1. An automatic transmission for a vehicle, comprising:
   a coupling means having an input shaft and an output shaft;
   a belt type continuously-variable speed transmission system having an input pulley mounted coaxially on a first shaft, an output pulley mounted coaxially on a second shaft and a belt extending between said first and second pulleys to transfer power, each of said first and second pulleys having a fixed sheave and a movable sheave, said first shaft being disposed coaxially with and rotatably coupled with said output shaft of said coupling means, said second shaft being disposed side by side and in parallel with said first shaft;
   a planetary gear mechanism having a first planetary gear set including a first sun gear, a first planetary gear, a first ring gear and a first planetary carrier, a second planetary gear set including a second sun gear, a second planetary gear, a second ring gear and a second planetary carrier, an input shaft disposed coaxially with and rotatably coupled at one end thereof with said second shaft of said belt type continuously-variable speed transmission system connected at the other end thereof concentrically with said first sun gear, an output shaft disposed coaxially with said input shaft and connected at one end thereof concentrically with said second planetary carrier, a first intermediate shaft disposed concentrically with and radially outward in connection with said input shaft and connected at one end thereof with said first ring gear and said second sun gear and a second intermediate shaft disposed concentrically with and between said input shaft and said first intermediate shaft in radial direction and connected at one end thereof with said first planetary carrier and said second ring gear, each of said first and second intermediate shaft having splines on an outer circumference thereof at the other end which is positioned between said output pulley of said belt type continuously-variable speed transmission system and said planetary gear mechanism;
   a forward-reverse changeover mechanism having one and single shift lever and one and single first sleeve, said first sleeve being positioned between said output pulley of said belt type continuously-variable speed transmission system and said planetary gear mechanism and disposed concentrically with and slidably movable but nonrotatable with respect to the rotational axis of said input shaft of said planetary gear mechanism and having splines on an inner circumference thereof adapted to selectively mesh with said splines formed on said first and second intermediate shafts, said shift lever being adapted to shift said first sleeve between a first position where said splines formed on said first sleeve is selectively meshed with said splines formed on said first intermediate shaft to hold said first ring gear and second sun gear in a stationary position to establish a forward range gear train and a second position where said splines formed on said first sleeve is selectively meshed with said splines formed on said second intermediate shaft to hold said first planetary carrier and said second ring gear in a stationary position to establish a reverse range gear train, and
   a low-high speed changeover mechanism having a second sleeve disposed concentrically with and slidably and rotatably with respect to the rotational axis of said output shaft of said planetary gear mechanism, a first and second discs disposed perpendicularly to and rotatably with respect to the rotational axis of said output shaft of said planetary gear mechanism, respectively, and a shift lever being engaged with said second sleeve at one end thereof, said first disc being linked to said first ring gear and having splines on an inner circumference thereof, said second disc being linked to said second planetary carrier and having splines on an inner circumference thereof, said second sleeve being slidably connected to and integrally rotatable with said second sun gear and having splines on an outer circumference thereof and adapted to selectively mesh with said splines formed on said first and second discs, said shift lever being adapted to shift said second sleeve between a first position where said splines formed on said second sleeve is meshed with said splines formed on said first disc to establish a forward speed range gear train and a second position where said splines formed on said second sleeve is meshed with said splines formed on said second disc to establish another forward speed range gear train.

2. An automatic transmission as claimed in claim 1, wherein said low-high speed changeover mechanism further includes at least a guide pin disposed between said first and second discs in a direction parallel with the rotational axis of said output shaft of said planetary gear mechanism and being loosely supported on said second sleeve whereby said guide pin contacts selectively with one of said first and second discs for synchronizing the rotational speed of said disc and said second sleeve when said second sleeve is shifted to one of said two positions.

* * * * *